United States Patent
Kageyama

(10) Patent No.: US 10,128,051 B2
(45) Date of Patent: Nov. 13, 2018

(54) VARIABLE CAPACITANCE COMPONENT

(71) Applicant: Murata Manufacturing Co., Ltd., Nagaokakyo-shi, Kyoto-fu (JP)

(72) Inventor: Keisuke Kageyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 180 days.

(21) Appl. No.: 15/050,541

(22) Filed: Feb. 23, 2016

(65) Prior Publication Data

US 2016/0172114 A1    Jun. 16, 2016

Related U.S. Application Data

(63) Continuation of application No. PCT/JP2014/072731, filed on Aug. 29, 2014.

(30) Foreign Application Priority Data

Sep. 2, 2013  (JP) .................................. 2013-180906

(51) Int. Cl.
*H01G 7/06* (2006.01)
*H01G 2/10* (2006.01)

(52) U.S. Cl.
CPC ............... *H01G 7/06* (2013.01); *H01G 2/103* (2013.01)

(58) Field of Classification Search
None
See application file for complete search history.

(56) References Cited

U.S. PATENT DOCUMENTS

| 4,807,085 A | * | 2/1989 | Yasukawa | H01G 2/12 361/321.1 |
| 6,454,830 B1 | * | 9/2002 | Ito | B22F 1/0011 75/255 |
| 2008/0210564 A1 | * | 9/2008 | Motoki | H01G 4/012 205/122 |
| 2009/0257167 A1 | * | 10/2009 | Kanno | H01G 7/06 361/278 |
| 2010/0014213 A1 | | 1/2010 | Wozniak et al. | |

(Continued)

FOREIGN PATENT DOCUMENTS

| CN | 103210456 A | 7/2013 |
| JP | 2-128414 A | 5/1990 |
| JP | 6-314602 A | 11/1994 |

(Continued)

OTHER PUBLICATIONS

English language translation of WO2012/028659.*

(Continued)

*Primary Examiner* — Dion R Ferguson
(74) *Attorney, Agent, or Firm* — Keating & Bennett, LLP

(57) ABSTRACT

A variable capacitance component includes a variable capacitance layer made of a dielectric material, a pair of electrodes that face each other via the variable capacitance layer, a pair of insulating portions that support the variable capacitance layer therebetween, and a pair of lead portions is respectively connected to the pair of electrodes, and the pair of lead portions is respectively disposed inside the pair of insulating portions, and the pair of lead portions is on a same axis that is perpendicular or substantially perpendicular to the variable capacitance layer.

15 Claims, 4 Drawing Sheets

(56) References Cited

U.S. PATENT DOCUMENTS

2014/0225793 A1    8/2014  Ikemoto et al.
2015/0364255 A1* 12/2015 Ning .................. H01G 2/22
                                            361/272

FOREIGN PATENT DOCUMENTS

| | | |
|---|---|---|
| JP | 8-153645 A | 6/1996 |
| JP | 10-223475 A | 8/1998 |
| JP | 2006-245367 A | 9/2006 |
| JP | 2008-21980 A | 1/2008 |
| JP | 2009-513006 A | 3/2009 |
| JP | 2011-101041 A | 5/2011 |
| WO | 2012/028659 A2 | 3/2012 |
| WO | 2013/061985 A1 | 5/2013 |

OTHER PUBLICATIONS

Official Communication issued in corresponding Chinese Patent Application No. 201480046715.9, dated Aug. 24, 2017.
Official Communication issued in International Application PCT/JP2014/072731, dated Dec. 9, 2014.

* cited by examiner

VARIABLE CAPACITANCE COMPONENT

BACKGROUND OF THE INVENTION

1. Field of the Invention

The present invention relates to a variable capacitance component.

2. Description of the Related Art

A variable capacitance component is known that has a capacitance varied by changing a permittivity of a dielectric layer by an applied voltage.

For example, Japanese Laid-Open Patent Publication No. 2011-101041 discloses a variable capacitance component having dielectric layers and electrodes alternately laminated so that the electrodes are formed into a comb shape.

WO 2013/061985 discloses a variable capacitance component in which ferroelectric thin films and film electrodes are respectively formed by a chemical solution deposition (CSD) method and a sputtering method.

A variable capacitance component having electrodes formed into a comb shape as described in Japanese Laid-Open Patent Publication No. 2011-101041 has a stray capacitance increased due to an electrode structure thereof and it is not easy to make a capacitance variable rate larger. Comb-shaped electrodes have portions (extending portions) extending from overlapping portions of electrodes facing each other toward respective opposite end surfaces. The present inventor discovered that such a structure generates a stray capacitance between the overlapping portions and the extending portions of the electrodes and that if the capacitance is reduced by making an overlapping area of the electrodes smaller or by making an applied voltage larger, the effect of this stray capacitance becomes relatively large and the capacitance variable rate decreases.

The variable capacitance component as described above has a dielectric layer and an electrode layer laminated and sintered at the same time. Therefore, it is generally difficult to use a low-loss metal such as Ag and Cu having a low melting point. To use such a metal, a sintering additive such as glass must be added to the dielectric layer to perform low-temperature firing. As a result, the performance of the dielectric layer is sacrificed.

An element obtained by the method of WO 2013/061985 has a relatively large conduction loss because a skin depth cannot be satisfied due to a thin thickness of electrodes and because an electrode material is limited to Pt or Au etc., so as to prevent peeling during annealing treatment after electrode formation and it is difficult to use Ag or Cu having a low loss at high frequency. Additionally, it is known that, if the CSD (chemical solution deposition) method or the sputtering method of WO 2013/061985 is used in order to increase the thickness of electrodes, a hillock is formed after the thickness exceeds about 500 nm, which may lead to a failure in a subsequent manufacturing process such as a lamination process. Although it is important to give consideration to impedance matching for reducing a loss in a device used at high frequency, the impedance matching is not easy in the method described in WO 2013/061985.

SUMMARY OF THE INVENTION

Therefore, preferred embodiments of the present invention provide a variable capacitance component which effectively reduces stray capacitance as much as possible and has a large capacitance variable rate even in a low capacitance region. Preferred embodiments of the present invention provide a variable capacitance component having lower loss.

As a result of intensive studies for solving the above-described problems, the present inventor discovered that a stray capacitance is able to be reduced by arranging on the same axis a pair of conductors leading electrodes inside a component to the outside of the component.

The present inventor discovered a configuration in which electrodes and lead portions are able to be sintered separately from a component main body so as to use copper or silver, which is suitable for use at high frequency and has a low loss, as an electrode material.

Therefore, a first aspect of preferred embodiments of the present invention provides a variable capacitance component including a variable capacitance layer made of a dielectric material; a pair of electrodes that face each other via the variable capacitance layer; a pair of insulating portions supporting the variable capacitance layer therebetween; and a pair of lead portions respectively connected to the pair of electrodes; wherein the pair of lead portions are respectively disposed inside the pair of insulating portions, and the pair of lead portions are on a same axis perpendicular or substantially perpendicular to the variable capacitance layer.

A second aspect of preferred embodiments of the present invention provides a process for producing a variable capacitance component including a variable capacitance layer made of a dielectric material, a pair of electrodes that face each other via the variable capacitance layer, a pair of insulating portions supporting the variable capacitance layer therebetween, and a pair of lead portions respectively connected to the pair of electrodes, and the pair of lead portions being respectively disposed inside the pair of insulating portions, and the pair of lead portions being on a same axis perpendicular or substantially perpendicular to the variable capacitance layer, the variable capacitance layer is produced by forming the dielectric material into a sheet shape or by laminating the sheets, the insulating portions are produced by laminating insulator sheets with forming through-holes or produced by forming the through-holes after the insulator sheets are laminated, the variable capacitance layer is sandwiched between the pair of insulating portions to obtain a laminated body, and the electrodes and the lead portions are formed by providing a conductive material to form the electrodes and the lead portions to the through-holes and sintering the conductive material with the laminated body or, the electrodes and the lead portions are formed by providing the conductive material to form the electrodes and the lead portions to the through-holes after sintering the laminated body.

A third aspect of preferred embodiments of the present invention provides a process for producing a variable capacitance component including a variable capacitance layer made of a dielectric material, a pair of electrodes that face each other via the variable capacitance layer, a pair of insulating portions supporting the variable capacitance layer therebetween, and a pair of lead portions respectively connected to the pair of electrodes, and the pair of lead portions being respectively disposed inside the pair of insulating portions, and the pair of lead portions being on a same axis perpendicular or substantially perpendicular to the variable capacitance layer, wherein the variable capacitance layer is sandwiched between the pair of insulating portions in which through-holes are formed to obtain a laminated body and sintering the variable capacitance layer, and then the electrodes and the lead portions are formed by providing a conductive material to form the electrodes and the lead portions to the through-holes.

Various preferred embodiments of the present invention provide a variable capacitance component including a variable capacitance layer made of a dielectric material, a pair of electrodes that face each other via the variable capacitance layer, a pair of insulating portions supporting the variable capacitance layer therebetween, and a pair of lead portions penetrating the insulating portions and respectively connected to the pair of electrodes wherein the lead portions are arranged on a same axis to significantly reduce or prevent a stray capacitance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Variable capacitance components according to various preferred embodiments of the present invention will now be described in detail with reference to the drawings. It is noted that shapes, arrangement, etc. of the variable capacitance component and constituent elements of the preferred embodiments are not limited to the examples descried and shown herein.

Figure 1:
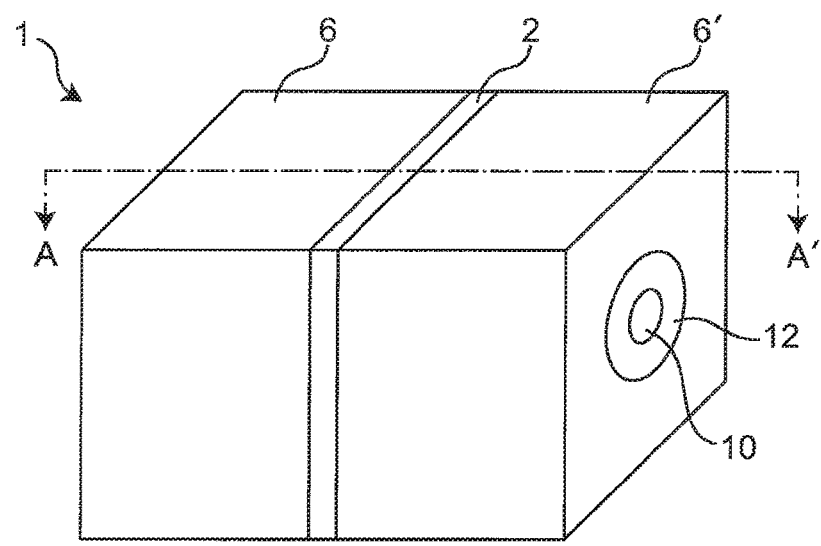
FIG. 1 is a schematic perspective view of a variable capacitance component according to a preferred embodiment of the present invention.
Figure 2:
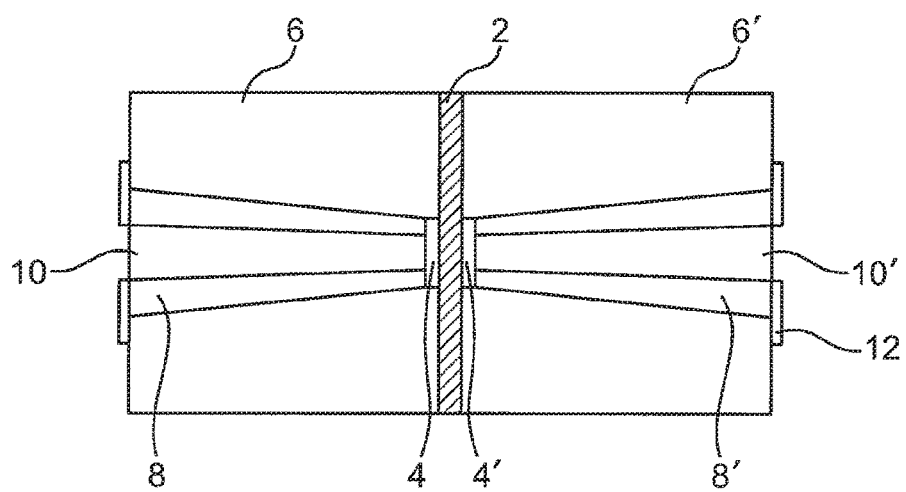
FIG. 2 is a schematic cross-sectional view taken along A-A' of a laminated coil component according to the preferred embodiment of FIG. 1.

As shown in FIGS. 1 and 2, a variable capacitance component 1 of this preferred embodiment includes a variable capacitance layer 2, a pair of electrodes 4 and 4' positioned to face each other via the variable capacitance layer 2, a pair of insulating portions 6 and 6' supporting the variable capacitance layer 2 therebetween, a pair of lead portions 8 and 8' electrically connected to the pair of the electrodes 4 and 4' and penetrating the insulating portions 6 and 6', and external electrodes 12 and 12'.

The variable capacitance layer 2 is made of one or more dielectric materials. By adjusting the thickness of the dielectric materials, the capacitance of the variable capacitance component is able to be adjusted.

The dielectric materials are not particularly limited as long as the materials are dielectric, and are preferably ferroelectric materials. By using the ferroelectric materials, the capacitance and the capacitance variable rate of the variable capacitance component are able to be made larger.

The ferroelectric materials are not particularly limited and include one or more ferroelectric materials selected from a sintered ceramic containing Ba, Sr, and Ti, a sintered ceramic containing Ba, Zr, and Ti, and a sintered ceramic containing Bi, Zn, and Nb. Such ferroelectric materials are generally known as $(BaSr)TiO_3$, $Ba(ZrTi)O_3$, and $(BiZn)Nb_2O_7$.

The thickness of the variable capacitance layer is not particularly limited to, but preferably is, for example, about 0.5 μm to about 100 μm, preferably about 1 μm to about 10 μm, more preferably about 1 μm to about 5 μm. The thickness of the variable capacitance layer is preferably about 10 μm or less from the viewpoint of increasing the capacitance of the variable capacitance component and is preferably about 1 μm or more for reliably ensuring insulation.

In a variable capacitance component of a preferred embodiment of the present invention, the pair of the electrodes 4 and 4' face each other on both main surfaces of the variable capacitance layer 2. By changing an area of contact surfaces between the electrodes and the variable capacitance layer, the capacitance of the variable capacitance component is able to be adjusted.

Although the electrodes 4 and 4' may be present at any position on the variable capacitance layer 2 in any size and shape as long as the electrodes face each other, the electrodes 4 and 4' preferably have the same size and the same shape as far as possible and are arranged symmetrically relative to the variable capacitance layer, preferably at the center of the variable capacitance layer.

A material constituting the electrodes is not particularly limited as long as the material is electrically conductive, and includes Ag, Cu, Pt, Ni, Al, Pd, Au, monel (Ni—Cu alloy), etc. Particularly, Ag or Cu is preferable because of a low conductive loss at high frequency.

A thickness of the electrodes is not particularly limited and is preferably about 0.5 μm or more, for example. By setting the thickness of the electrodes to about 0.5 μm or more, resistance is further reduced and a skin depth is ensured.

In the variable capacitance component 1 according to a preferred embodiment of the present invention, the pair of the lead portions 8 and 8' is respectively connected to the electrodes 4 and 4' and is arranged inside the pair of the insulating portions 6 and 6'. The lead portions have a function of leading the electrodes to the outside of the variable capacitance component.

The pair of the lead portions 8 and 8' preferably are on a same axis perpendicular or substantially perpendicular to the variable capacitance layer 2. "Perpendicular or substantially perpendicular to the variable capacitance layer" means that an angle defined by the axis relative to the variable capacitance layer is 90° or substantially 90°, for example, 80 to 90°, preferably 85 to 90°, more preferably 88 to 90°. Such arrangement enables a reduction in a stray capacitance.

A material constituting the lead portions is not particularly limited as long as the material is electrically conductive, and includes Ag, Cu, Pt, Ni, Al, Pd, Au, monel (Ni—Cu alloy), etc. Particularly, Ag or Cu is preferable because of a low conductive loss at high frequency.

Preferably, the lead portion is made of the same material as the electrode and is formed integrally with the electrode.

A shape of the lead portions is not particularly limited and can be, for example, a circular column shape, a truncated cone shape, a rectangular column shape, a truncated pyramid shape, or a hollow body thereof, for example, a hollow circular column shape or a hollow truncated cone shape. From the view point of easiness of producing, the shape is preferably a hollow or solid circular column or truncated cone shape. An axial length of the lead portions is not particularly limited and may appropriately be selected in accordance with a desired element size.

A thickness of the lead portions is not particularly limited as long as the skin depth can be ensured.

In the variable capacitance component 1 according to a preferred embodiment of the present invention, the insulating portions 6 and 6' are positioned such that they sandwich the variable capacitance layer 2 and have through-holes 10 and 10'. The lead portions 8 and 8' are present inside the through-holes 10 and 10'. The pair of the insulating portions supports the variable capacitance layer therebetween via the pair of the electrodes.

The pair of the insulating portions is arranged such that the through-holes thereof are arranged on the same axis perpendicular or substantially perpendicular to the variable capacitance layer and the electrodes present at ends of the through-holes on the variable capacitance layer side. The size of the electrodes may be the same as or different from that of openings of the through-holes. The shape of the through-holes can appropriately be selected in accordance with the shape of the lead portions penetrating therethrough.

A material constituting the insulating portions is not particularly limited as long as the material has an insulation property, and for example, a ceramic material or a resin can be used. The material is preferably the ceramic material because the ceramic material can be sintered together with the variable capacitance layer.

The ceramic material is not particularly limited and can be a general insulating ceramic material, for example, a sintered material of glass, metal oxide, metal nitride, or metal carbide.

In one preferred embodiment of the present invention, the ceramic material may be the same as the dielectric material constituting the variable capacitance layer. By using the same material as the dielectric material constituting the variable capacitance layer, a difference in coefficient of thermal expansion is able to be eliminated between the insulating portions and the variable capacitance layer to significantly reduce or prevent a stress generated therebetween during sintering.

In another preferred embodiment, the ceramic material may be a material having a permittivity lower than the dielectric material constituting the variable capacitance layer. By reducing the permittivity of the ceramic material constituting the insulating portions, the stray capacitance of the variable capacitance component is significantly reduced and the capacitance variable rate is consequently larger.

A relative permittivity of the ceramic material is not particularly limited, but is preferably 500 or less, more preferably 300 or less, further preferably 100 or less, yet further preferably 30 or less.

A thickness of the insulating materials (thickness in a direction perpendicular to the variable capacitance layer) is not particularly limited and can appropriately be selected in accordance with a desired element size.

The variable capacitance component 1 includes external electrodes 12 on surfaces of the insulating portions opposite to the surfaces supporting the variable capacitance layer. Although the external electrodes preferably are disposed in this preferred embodiment, the external electrodes are not essential elements and the lead portions may directly be connected to external lines without disposing the external electrodes.

A material of the external electrodes is not particularly limited as long as the material is electrically conductive, and includes Ag, Cu, Pt, Ni, Al, Pd, Au, monel (Ni—Cu alloy), etc. Preferably, the same material as the electrode and the lead portion is used.

Although one preferred embodiment of the present invention has been described, the present invention is not limited to the preferred embodiment and can variously be altered.

Figure 3:
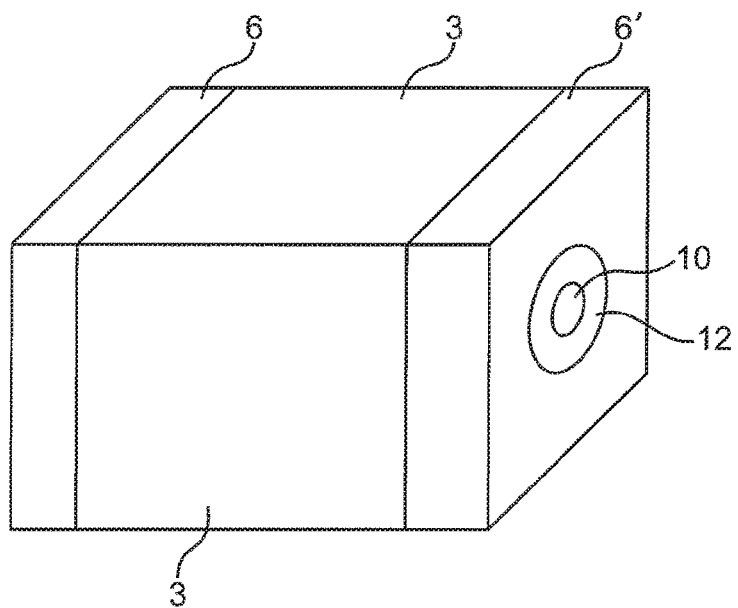
FIG. 3 is a schematic perspective view of a variable capacitance component according to another preferred embodiment of the present invention.

For example, as shown in FIG. 3, a variable capacitance component according to a preferred embodiment of the present invention may include a conducting portion 3 on at least one of the surfaces perpendicular to the main surfaces of the variable capacitance layer. By disposing such a conducting portion 3, radiation loss of an electromagnetic wave is reduced.

For example, the variable capacitance component 1 of this preferred embodiment described above is produced as follows.

First, the variable capacitance layer preferably made of a dielectric material.

The dielectric material is molded into a sheet shape to form a dielectric sheet. For example, the dielectric material is mixed/kneaded with an organic vehicle containing a binder resin and an organic solvent and molded into a sheet shape to form the dielectric sheet; although the present invention is not limited thereto. A plurality of the dielectric sheets is laminated and pressure-bonded to obtain the variable capacitance layer. One dielectric sheet can be used as the variable capacitance layer.

Next, the insulating portion is formed by using an insulating material.

For example, when the insulating material is the ceramic material, the ceramic material may be mixed/kneaded with an organic vehicle containing a binder resin and an organic solvent and molded into a sheet shape to obtain ceramic sheets as is the case in forming of the variable capacitance layer. The ceramic sheets are laminated to a desired thickness and pressure-bonded to obtain a laminated body of the ceramic sheets (hereinafter also referred to as a ceramic laminated body). Subsequently, the through-holes for forming the lead portions are formed in the ceramic laminated body to obtain the insulating portions. A method or device used to form the through-holes is not particularly limited and, for example, the through-holes can be formed by using a laser or a mechanical punch. The formed through-holes may be filled with, for example, a carbon paste so as to prevent deformation during pressure bonding.

Then, the ceramic laminated body, the variable capacitance layer, and the other ceramic laminated body are laminated in this order such that the through-holes of the two ceramic laminated bodies are on the same axis, and are pressure-bonded to obtain a laminated body.

Then, the obtained laminated body is sintered. A conductive material is filled as a conductive paste, for example, a silver paste, into the through-holes so as to form the electrodes and the lead portions and the conductive paste is also applied to the surfaces exposing the through-holes so as to form the external electrodes, then the laminated body is sintered again, or films of the conductive material are formed inside the through-holes and on external electrode formation portions by a sputtering method.

The variable capacitance component 1 of this preferred embodiment is preferably produced as described above, for example.

The method of producing the variable capacitance component 1 according to a preferred embodiment of the present invention is not limited to the preferred embodiments and can variously be altered.

For example, when the ceramic laminated body is formed, the through-holes are formed after the laminated body is obtained in the above preferred embodiment; although the present invention is not limited thereto. For example, a ceramic paste may be printed and laminated while the through-holes are formed by a photolithography method.

Although the electrodes and the lead portions preferably are formed after the variable capacitance layer and the insulating portions are sintered in the above preferred embodiment, for example, the entire element may be co-sintered after the conductive paste is filled while laminating the ceramic sheets; the conductive paste is filled into the through-holes before laminating the variable capacitance layer and the ceramic laminated bodies; or the conductive paste is filled after laminating the variable capacitance layer and the ceramic laminated bodies and before sintering.

Alternatively, after the conductive paste for forming the electrodes is applied onto the main surfaces of the variable capacitance layer and the insulating portions are then laminated, the conductive paste may be filled into the through-holes.

Alternatively, the variable capacitance layer and the insulating portions may individually be sintered and subsequently be bonded in the order of the insulating portion, the variable capacitance layer, and the other insulating portion. The bonding method is not particularly limited, for example, the bonding may be performed by using an adhesive or glass.

Preferably, as in the above-described preferred embodiment, after the variable capacitance layer and the insulating portions are sintered, the conductive paste is sintered to form the electrodes and the lead portions. By performing the sintering separately in this way, a metal having a melting point lower than the sintering temperature of the variable capacitance layer and the insulating portions, for example, Ag or Cu, can be used as the material of the electrode and the lead portion.

Example 1

Next, a non-Limiting example of a method of preparation of a variable capacitance component according to a preferred embodiment of the present invention will be described.

Powders of $BaCO_3$, $Nd_2O_3$, $Al_2O_3$, $SiO_2$, and $TiO_2$ were weighed to form a predetermined composition having a relative permittivity of approximately 300 (0.65 $BaTiO_3$-0.20 $NdAlO_3$-0.25 $SiO_2$-0.10 $Al_2O_3$ (molar ratio)). The weighed material was put into a ball mill and mixed and ground for 16 hours in a wet method and was dried and subsequently calcined at 1200° C. for two hours. After an obtained calcined material was put into the ball mill again and ground for 16 hours in a wet method, a binder and a plasticizer were added and the material was formed into a sheet shape having a thickness of 30 μm by a doctor blade method. After an obtained sheet was punched into a predetermined size, 20 sheets were stacked and temporarily pressure-bonded.

Then, a via hole was formed in obtained laminated body by a laser and a carbon paste was filled into the via hole to fill the via. One sheet (same as the sheet in which the via portion was formed) as the variable capacitance layer was sandwiched between these two laminated bodies and laminated such that the via holes formed in the two laminated bodies overlap with each other, and was pressure-bonded at 100 MPa and pressure-bonded by warm isostatic press (WIP) at 60° C. and 200 MPa to obtain a laminated body. The obtained laminated body was cut by a dicer into pieces (length L=1.0 mm, width W=0.5 mm, height T=0.5 mm) and fired at 1000° C. to 1400° C.

After an Ag pastes was filled into the via hole and the same Ag paste was applied to a portion exposing the via so as to form the external electrodes, sintering was performed at 750° C. to obtain a sample (variable capacitance component) of Example 1 as shown in FIGS. 1 and 2.

Figure 4:
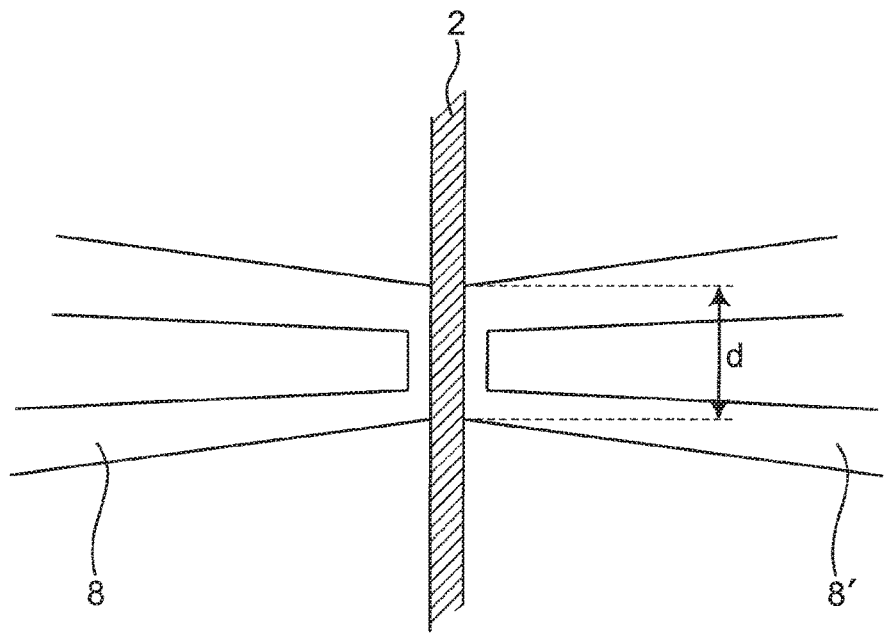
FIG. 4 is an enlarged view of the periphery of electrode portions in the cross-sectional view of FIG. 2.

Four types of samples (variable capacitance component) of Example 1 were produced as described above such that an abutting portion of the electrodes shown in FIG. 4 has a diameter d of approximately 5 μm, 10 μm, 20 μm, and 30 μm.

Figure 6:
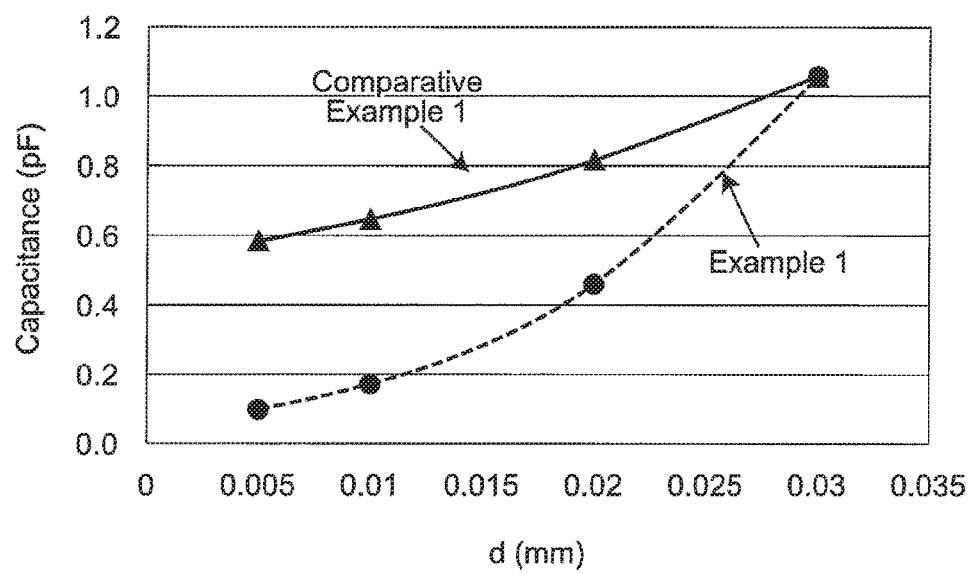
FIG. 6 is a graph of capacitance of variable capacitance components of Example 1 and Comparison Example 1.

The capacitances of the four types of the obtained samples were measured by using an impedance analyzer (HP4294A manufactured by Agilent Technologies) under the conditions of the temperature of 25±2° C., the voltage of 1 Vrms, and the frequency of 1 kHz to obtain an average value of 10 samples for each type. The result is shown in FIG. 6.

Comparison Example 1

Figure 5A:
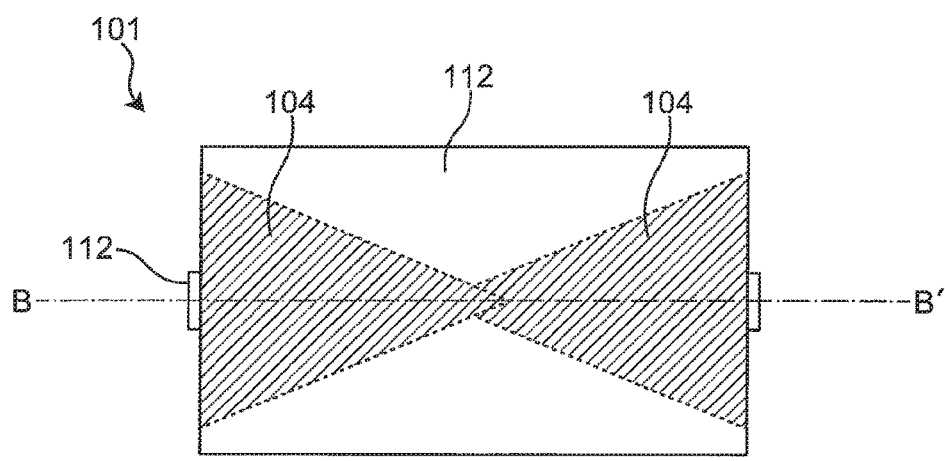
FIG. 5A is a schematic transparent plane view for showing shapes and positions of internal electrodes of a variable capacitance component formed by using a conventional technique and FIG. 5B is a schematic cross-sectional view taken along B-B' of FIG. 5A.
Figure 5B:
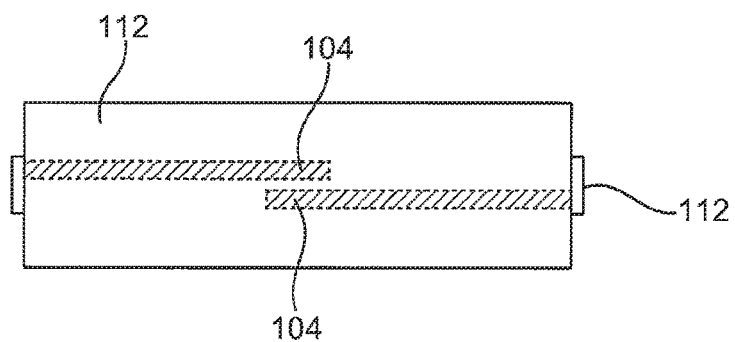

On sheets produced in Example 1, a Pd paste was printed into an approximately triangular shape as shown in FIG. 5 and the sheets were laminated such that tip portions thereof overlap each other via one sheet, and were pressure-bonded by warm isostatic press (WIP) at 60° C. and 200 MPa to obtain a laminated body. The obtained laminated body was cut by a dicer into pieces (length L=1.0 mm, width W=0.5 mm, height T=0.5 mm) and fired at 1100° C. to 1400° C.

Subsequently, an Ag paste was applied to side surfaces to form external electrodes and was sintered at 750° C. to produce a comparison example sample.

Four types of comparison example samples were produced as described above such that an area of an overlapping portion of the electrodes shown in FIG. 5 is set to the same areas as the samples with the abutting portion of the electrodes of Example 1 having the diameter d of 5 μm, 10 μm, 20 μm, and 30 μm.

The capacitances of the four types of the obtained comparison example samples were measured by using an impedance analyzer (HP4294A manufactured by Agilent Technologies) under the conditions of the temperature of 25±2° C., the voltage of 1 Vrms, and the frequency of 1 kHz to obtain an average value of 10 samples for each type. The result is also shown in FIG. 6.

As seen in FIG. 6, the capacitance of the comparison example samples having a conventional lamination structure decreases only to approximately 0.6 pF even when the overlapping dimension of the inner electrodes is reduced to 5 μm. In contrast, the capacitance of the samples of Example 1 decreases to approximately 0.1 pF when the diameter of the abutting portion is reduced to about 5 μm. It is considered that this is because the stray capacitance is able to be significantly reduced to a greater degree in the samples of Example 1 as compared to the comparison example samples having the conventional lamination structure and, therefore, a capacitance variable range to be inherently possessed by the elements is able to widely be used.

Example 2

Powders of $BaCO_3$, $SrCO_3$, and $TiO_2$ were weighed to form a predetermined composition having a relative permittivity of approximately 2000 (($Ba_{0.6}Sr_{0.4}$)$TiO_3$). This weighed material was used for producing samples of Example 2 in the same procedure as Example 1.

Example 3

Powders of $CaCO_3$, $Al_2O_3$, $SiO_2$, and $B_2O_3$ were weighed to form a predetermined composition having a relative permittivity of approximately 7 (obtained by mixing a glass ceramic made of 0.16 CaO-0.11 $Al_2O_3$-0.64 $SiO_2$-0.09 $B_2O_3$ (molar ratio) with $Al_2O_3$ at 1:1 (weight ratio)). This weighed material was used for producing 30 μm-thick sheets made of a CaO—$Al_2O_3$—$SiO_2$—$B_2O_3$-based glass ceramic in the same procedure as Example 1. After an obtained sheet was punched into a predetermined size, 20 sheets were stacked and temporarily pressure-bonded.

Subsequently, a via hole was formed in the obtained laminated body by a laser and a carbon paste was filled into the via hole to fill the via. One sheet formed in Example 2 was sandwiched as the variable capacitance layer between these two laminated bodies and laminated such that the vias formed in the two laminated bodies overlap with each other, and was pressure-bonded at 100 MPa and pressure-bonded by warm isostatic press (WIP) at 60° C. and 200 MPa to obtain a laminated body. The obtained laminated body was cut by a dicer into pieces (length L=1.0 mm, width W=0.5 mm, height T=0.5 mm) and sintered at 1100° C. to 1400° C.

After an Ag paste was filled into the via holes and the same Ag paste was applied to portions exposing the vias so as to form the external electrodes, sintering was performed at 750° C. to obtain samples of Example 3.

A direct current is applied to the samples of Examples 2 and 3 and the capacitances are measured under the conditions of 1 kHz and 1V to obtain $$\text{capacitance variable rate} = (Cap_0 - Cap_{DC})/Cap_0 \times 100 \, (\%).$$

$Cap_{DC}$ is a capacitance value when a predetermined DC voltage is applied and $Cap_0$ is a capacitance value when no DC voltage is applied. The result is shown in FIG. 7.

Figure 7:
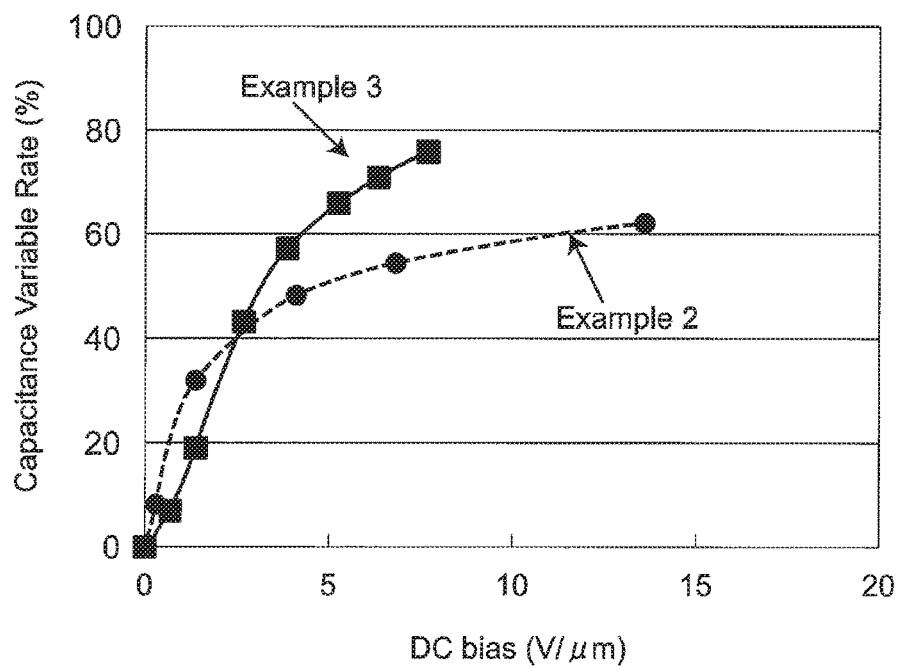
FIG. 7 is a graph of a capacitance variable rate relative to applied voltage in variable capacitance components of Examples 2 and 3.

As shown in FIG. 7, in Example 2 in which the insulating portions and the variable capacitance layer are made of the same material that is a BST-based material (relative permittivity: 2000), a change in the capacitance was made smaller as the DC applied voltage became equal to or greater than 3 V/μm and the capacitance became smaller. In contrast, in Example 3 in which the material with a low permittivity (relative permittivity: 7) is used for the insulating portions, the capacitance was sufficiently changed relative to a change in the DC voltage even when the DC applied voltage was equal to or greater than 3 V/μm. It is considered that this is because when the capacitance becomes small, the effect of the stray capacitance becomes relatively large and no change occurs in apparent capacitance even though a higher voltage is applied. In particular, it is considered that the change in the capacitance is not reduced even when a relatively high voltage is applied in Example 3 as compared to Example 2 because, although the stray capacitance becomes relatively large between both end surfaces of the variable capacitance component in Example 2 having a larger relative permittivity of the insulating portions (relative permittivity: 2000), this stray capacitance can be suppressed in Example 3 having a small relative permittivity of the insulating portions (relative permittivity: 7).

Protection elements according to various preferred embodiments of the present invention are usable in various electronic devices such as an RFID (radio frequency identification) system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A variable capacitance component comprising:
   a variable capacitance layer made of a dielectric material;
   a pair of electrodes that face each other via the variable capacitance layer;
   a pair of insulating portions supporting the variable capacitance layer therebetween;
   a pair of lead portions respectively connected to the pair of electrodes; and
   a pair of external electrodes electrically connected to the lead portions; wherein
   the pair of lead portions are respectively disposed inside the pair of insulating portions, and the pair of lead portions are on a same axis perpendicular or substantially perpendicular to the variable capacitance layer;
   the external electrodes are positioned only on surfaces of the insulating portions opposite to surfaces supporting the variable capacitance layer;
   the insulating portions are made of a dielectric material having a permittivity lower than the dielectric material of which the variable capacitance layer is made; and
   the pair of electrodes are disposed on the main surfaces of the variable capacitance layer and inside the pair of the insulation portions.

2. The variable capacitance component according to claim 1, the pair of insulating portions supports the variable capacitance layer therebetween via the pair of electrodes.

3. The variable capacitance component according to claim 1, wherein the electrodes and the lead portions are made of Ag or Cu.

4. The variable capacitance component according to claim 1, wherein the electrodes and the lead portions have a thickness of about 0.5 μm to about 100 μm.

5. The variable capacitance component according to claim 1, further comprising a conducting portion on at least one of surfaces of the insulating portions perpendicular or substantially parallel to the variable capacitance layer.

6. A process for producing a variable capacitance component including a variable capacitance layer made of a dielectric material, a pair of electrodes that face each other via the variable capacitance layer, a pair of insulating portions supporting the variable capacitance layer therebetween, a pair of lead portions respectively connected to the pair of electrodes, and a pair of external electrodes electrically connected to the lead portions; wherein the pair of lead portions are respectively disposed inside the pair of insulating portions, the pair of lead portions are on a same axis perpendicular or substantially perpendicular to the variable capacitance layer, the external electrodes are positioned only on surfaces of the insulating portions opposite to surfaces supporting the variable capacitance layer, the insulating portions are made of a dielectric material having a permittivity lower than the dielectric material of which the variable capacitance layer is made, and the pair of electrodes are disposed on the main surfaces of the variable capacitance layer and inside the pair of the insulation portions; wherein the variable capacitance layer is produced by forming the dielectric material into a sheet shape or by laminating the sheets;

the insulating portions are produced by laminating insulator sheets with forming through-holes or produced by forming the through-holes after the insulator sheets are laminated;

the variable capacitance layer is sandwiched between the pair of insulating portions to obtain a laminated body; and the electrodes and the lead portions are formed by providing a conductive material to define the electrodes and the lead portions to the through-holes and firing the conductive material with the laminated body or, the electrodes and the lead portions are formed by providing the conductive material to define the electrodes and the lead portions to the through-holes after sintering the laminated body.

7. The process according to claim 6, wherein the electrodes and the lead portions are formed of Ag or Cu.

8. The process according to claim 6, wherein the electrodes and the lead portions are formed to have a thickness of about 0.5 μm to about 100 μm.

9. The process according to claim 6, further comprising forming external electrodes on surfaces of the insulating portions opposite to the surfaces supporting the variable capacitance layer, and electrically connecting the external electrodes to the lead portions.

10. The process according to claim 6, further comprising forming a conducting portion on at least one of surfaces of the insulating portions perpendicular or substantially parallel to the variable capacitance layer.

11. A process for producing a variable capacitance component including a variable capacitance layer made of a dielectric material, a pair of electrodes that face each other via the variable capacitance layer, a pair of insulating portions supporting the variable capacitance layer therebetween, a pair of lead portions respectively connected to the pair of electrodes, and a pair of external electrodes electrically connected to the lead portions, and the pair of lead portions being respectively disposed inside the pair of insulating portions, the pair of lead portions being on the same axis perpendicular or substantially perpendicular to the variable capacitance layer, and the external electrodes are positioned only on surfaces of the insulating portions opposite to surfaces supporting the variable capacitance layer, the insulating portions are made of a dielectric material having a permittivity lower than the dielectric material of which the variable capacitance layer is made, and the pair of electrodes are disposed on the main surfaces of the variable capacitance layer and inside the pair of the insulation portions; wherein the variable capacitance layer is sandwiched between the pair of insulating portions in which through-holes are formed to obtain a laminated body and sintering the variable capacitance layer, and then the electrodes and the lead portions are formed by providing a conductive material to define the electrodes and the lead portions to the through-holes.

12. The process according to claim 11, wherein the electrodes and the lead portions are formed of Ag or Cu.

13. The process according to claim 11, wherein the electrodes and the lead portions are formed to have a thickness of about 0.5 μm to about 100 μm.

14. The process according to claim 11, further comprising forming external electrodes on surfaces of the insulating portions opposite to the surfaces supporting the variable capacitance layer, and electrically connecting the external electrodes to the lead portions.

15. The process according to claim 11, further comprising forming a conducting portion on at least one of surfaces of the insulating portions perpendicular or substantially parallel to the variable capacitance layer.

* * * * *